(12) United States Patent
Karimli et al.

(10) Patent No.: US 10,715,979 B2
(45) Date of Patent: *Jul. 14, 2020

(54) PROVISIONING DEVICE AND/OR LINE SHARING CAPABILITIES TO INTERNET OF THINGS (IOT) DEVICES

(71) Applicant: T-Mobile USA, Inc., Bellevue, WA (US)

(72) Inventors: Yasmin Karimli, Kirkland, WA (US); Ming Shan Kwok, Seattle, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/455,613

(22) Filed: Jun. 27, 2019

(65) Prior Publication Data

US 2019/0327591 A1    Oct. 24, 2019

Related U.S. Application Data

(63) Continuation of application No. 15/599,718, filed on May 19, 2017, now Pat. No. 10,382,919.

(Continued)

(51) Int. Cl.
*H04W 4/50* (2018.01)
*H04W 4/70* (2018.01)
(Continued)

(52) U.S. Cl.
CPC ............. *H04W 4/50* (2018.02); *H04L 9/3213* (2013.01); *H04W 4/70* (2018.02);
(Continued)

(58) Field of Classification Search
CPC .............................. H04L 9/3213; H04W 4/50
See application file for complete search history.

(56) References Cited

U.S. PATENT DOCUMENTS 9,451,098 B2    9/2016 Zhu et al.
2008/0081611 A1    4/2008 Hoyt et al.
(Continued)

FOREIGN PATENT DOCUMENTS

KR    100735427    7/2007

OTHER PUBLICATIONS

Office Action for U.S. Appl. No. 15/599,718, dated Feb. 14, 2018, Yasmin Karimli , "Provisioning Device and/or Line Sharing Capabilities to Internet of Things (IoT) Devices", 12 pages.
Office Action for U.S. Appl. No. 15/599,718, dated Aug. 27, 2018,Yasmin Karimli , "Provisioning Device and/or Line Sharing Capabilities to Internet of Things (IoT) Devices", 14 pages.
(Continued)

*Primary Examiner* — Hsinchun Liao
(74) *Attorney, Agent, or Firm* — Lee & Hayes, P.C.

(57) ABSTRACT

Provisioning device and/or line sharing capabilities to Internet of Things (IoT) devices is described. A first device can provide first data associated with an identifier to a second device (e.g., an IoT device) and can send, to server(s), a request to provision a subscriber account and/or a communication address of the first device to the second device. The first request can include the first data. The second device can receive the first data and can provide second data associated with the identifier to the server(s). The server(s) can compare the first data and the second data. Based on determining the first data and the second data include the identifier, the server(s) can provision device and/or line sharing capabilities to the second device to enable the second device to send and/or receive communications associated with the subscriber account and/or the communication address.

20 Claims, 8 Drawing Sheets

Related U.S. Application Data

(60) Provisional application No. 62/457,304, filed on Feb. 10, 2017.

(51) Int. Cl.
*H04W 12/00* (2009.01)
*H04L 9/32* (2006.01)
*H04L 29/06* (2006.01)
*H04W 12/06* (2009.01)

(52) U.S. Cl.
CPC ..... *H04W 12/0023* (2019.01); *H04L 63/0807* (2013.01); *H04W 12/00512* (2019.01); *H04W 12/06* (2013.01)

(56) References Cited

U.S. PATENT DOCUMENTS

| | | |
|---|---|---|
| 2016/0050557 A1 | 2/2016 | Park et al. |
| 2016/0088467 A1 | 3/2016 | Reddem et al. |
| 2016/0286387 A1 | 9/2016 | Pavlovski et al. |
| 2016/0330608 A1 | 11/2016 | Benn |
| 2017/0019460 A1 | 1/2017 | Gu |
| 2017/0038847 A1 | 2/2017 | Schorsch et al. |
| 2018/0234787 A1 | 8/2018 | Karimli et al. |

OTHER PUBLICATIONS

PCT Search Report and Written Opinion dated May 10, 2018 for PCT Applicaiton No. PCT/US18/15404, 11 pages.
The Extended European Search Report dated Apr. 30, 2020 for European Patent Application No. 18751828.7, 9 pages.

US 10,715,979 B2

PROVISIONING DEVICE AND/OR LINE SHARING CAPABILITIES TO INTERNET OF THINGS (IOT) DEVICES

PRIORITY APPLICATION

This application is a continuation of and claims priority to U.S. patent application Ser. No. 15/599,718, filed on May 19, 2017, which claims priority to U.S. Provisional Application No. 62/457,304, filed Feb. 10, 2017, and entitled "IoT Smart Duplicate Lines," the entire contents of which are incorporated herein by reference.

BACKGROUND

Consumers have multiple telecommunication devices such as cellular phones, tablet computers, laptops, and other devices. Each device can have its own communication address, such as a telephone number, and can receive communications directed to any communication address associated with a service account.

In IP Multimedia Subsystem (IMS), call forking can be achieved through implicit registration sets (IRS). With IRS, when any one network identity (e.g., IP Multimedia Public Identifier (IMPU)) associated with a communication address is registered, other network identities associated with a same service account as that network identity are also registered. When a communication is received and directed to any one network identity of the registration set, it can be sent to all network identities of that registration set.

Session Initiation Protocol (SIP), as extended by RFC 3265 ("Session Initiation Protocol (SIP)-Specific Communication Notification," June 2002), utilizes a subscribe method to request a current state as well as state updates from a remote node. The specification for Open Mobile Alliance (OMA) Presence SIMPLE (SIP for Instant Messaging and Presence Leveraging Extensions) defines mechanisms for utilizing SIP to perform instant messaging and other functions. Rich Communication Services (RCS) is a GSM Association (GSMA) program that provides for interoperability within an IP Multimedia Subsystem (IMS). One feature of RCS is the ability to discover capabilities of contacts. RCS utilizes OMA Presence SIMPLE for various data items, including subscription to a presence server to obtain capability information for a list of contacts.

Telecommunication devices can be associated with subscriber identity module (SIM) cards which store personal information of respective consumers. A SIM card can be a portable memory chip or an embedded memory chip (eSIM). A SIM card associated with a telecommunication device can include data associated with a phone number of a consumer associated with the telecommunication device, an address book of the consumer, text messages sent and received via the telecommunication device, and other data. Generally, when a consumer opens a service account associated with a telecommunication service provider, the telecommunication service provider can activate a SIM card of a telecommunication device associated with the service account of the consumer. That is, each SIM card includes a unique number printed on the memory chip which requires activation by the telecommunication service provider (e.g., via a website associated with the telecommunication service provider, via a call to the telecommunication service provider, etc.).

Embedded SIM (eSIM) cards are a new generation of SIM cards which are embedded in devices, such as telecommunication devices. eSIM cards can have multiple applications, one which supports over the air provisioning of a profile which identifies the device in which the eSIM card is embedded to a telecommunications service provider. Currently, GSMA offers an eSIM remote provisioning specification which enables a profile on an eSIM card to be changed remotely without having to change the eSIM card itself.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
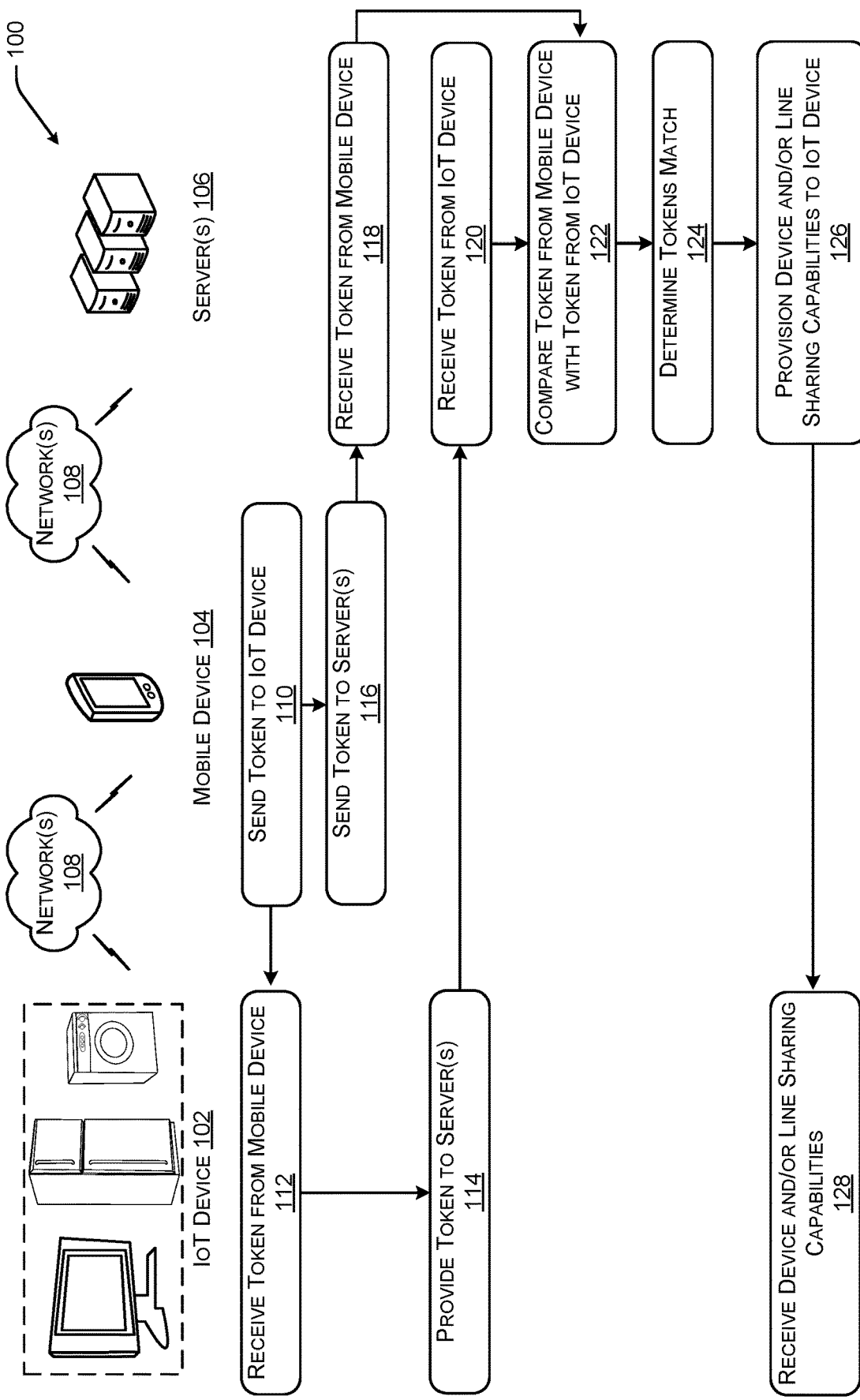
FIG. 1 illustrates an example process for provisioning device and/or line sharing capabilities to Internet of Things (IoT) devices.

In examples of the present disclosure, provisioning device and/or line sharing capabilities to Internet of Things (IoT) devices is described. A group of related devices includes two or more devices that are associated with the same subscriber account, share the same communication address, and so forth. Devices sharing the same subscriber account are often associated with an international mobile subscriber identity (IMSI). Devices sharing the same communication address are configured to send, receive, and initiate cellular communications using a shared identifier, address, and so forth, such as a telephone number, Mobile Station International Subscriber Directory Number (MSISDN), IP Multimedia Public Identifiers (IMPU), and so forth. Thus, devices are related in some examples based on being associated with the same "account" (e.g., associated with an IMSI), associated with the same "line" (e.g., associated with the same communication address), and so forth. That is, for the purpose of this discussion, devices that are associated with a same account and/or a same line can be referred to as "related devices." In some examples, related devices can include devices for which incoming calls and messages sent to a common communication address can be sent to all of the related devices. That is, related devices have device and/or line sharing capabilities.

The "Internet of Things" is the inter-networking of devices that are embedded with technologies that enable the devices to collect and exchange data via network(s). For the purpose of this discussion, such devices can be called "IoT devices." IoT devices can be embedded with software and network connectivity such that they can exchange data with other IoT devices, mobile phones, etc. In at least one example, IoT devices can include appliances. An appliance can be a device that accomplishes a particular function. Appliances can include devices that perform household functions (e.g., washing machines, dryers, refrigerators, ovens, freezers, etc.), entertainment functions (e.g., televisions, video game consoles, sound systems, etc.), etc. A mobile device can also be considered an IoT device. For the purpose of this discussion, "IoT device" is used to describe a device that is not programmed with subscriber account information or a communication address at the point-of-sale. That is, for the purpose of this discussion, an "IoT device" can be a device that when sold at the point-of-sale, is not associated with a telecommunications service provider, a subscriber account, and/or communications address.

For the purpose of this discussion, a "mobile device" can be a device associated with a telecommunications service provider. That is, a "mobile device," as used herein can have a profile associated with a subscriber identity module (SIM) card of the mobile device that indicates associated subscriber account information or a communication address associated with a telecommunications service provider.

Techniques described herein are directed to provisioning device and/or line sharing capabilities to IoT devices. In at least one example, IoT devices can include a SIM card. In some examples, the SIM card can be removable from the IoT device for programming. In other examples, the SIM card can be an embedded SIM (eSIM) card and may not be easily removed. Techniques described herein are directed to programming, via the use of a mobile device, a profile on an eSIM card associated with an IoT device to provision the IoT device with device and/or line sharing capabilities. That is, techniques described herein are directed to programming a profile on an eSIM card associated with an IoT device so that the IoT device is associated with a same subscriber account, a same communication address, and so forth, as the mobile device. As a result, the IoT device is related to the mobile device and can participate in device and/or line sharing capabilities as described herein.

Various examples of the present disclosure are described below in reference to the figures.

FIG. 1 illustrates an example process 100 for provisioning device and/or line sharing capabilities to IoT devices. Additional details associated with an environment for provisioning device and/or line sharing capabilities to an IoT device is described below with reference to FIG. 2.

In FIG. 1, an IoT device 102, a mobile device 104, and/or one or more servers 106 communicate via one or more networks 108. An IoT device 102 can be any device embedded with software and network connectivity such that it can exchange data with other IoT devices, mobile devices, etc., as described above. An example of an IoT device 102 can be an appliance, as described above. Additional details associated with IoT device 102 are described below with reference to FIGS. 2 and 3.

Mobile device 104 can be any device embedded with software and network connectivity such that it can exchange data with other mobile devices, IoT devices, etc. Non-limiting examples of a mobile device include smartphones, mobile computers, tablet computers, etc. Additional details associated with mobile device 104 are described below with reference to FIGS. 2 and 4. In at least one example, mobile device 104 can be related to one or more other related devices. That is, mobile device 104 can be associated with a same subscriber account, a same communication address, and so forth as one or more other devices. Devices sharing the same subscriber account are often associated with an international mobile subscriber identity (IMSI). Devices sharing the same communication address are configured to send, receive, and initiate cellular communications using a shared identifier, address, and so forth. In at least one example, as described above, mobile device 104 can receive incoming calls and messages sent to the common communication address(es).

Server(s) 106 can be any type of server, such as a network-accessible server. Additional details associated with the server(s) 106 are described below with reference to FIGS. 2 and 5. As described above, the IoT device 102, mobile device 104, and/or server(s) 106 can communicate via one or more network(s) 108. As described herein, network(s) 108 can include a cellular network, the Internet, and/or other network(s). Additional details associated with the network(s) 108 are described below with reference to FIG. 2.

In at least one example, the mobile device 104 can provide a token to the IoT device 102, as illustrated in block 110. In at least one example, the token can include an identifier. The IoT device 102 can receive the token, as illustrated in block 112, and can send the token to the server(s) 106, as illustrated in block 114. As described herein, in an alternate example, the IoT device 102 can provide a token to the mobile device 104 instead of the mobile device 104 providing the token to the IoT device 102. In either example, the mobile device 104 can provide the token to the server(s) 106 with an indication that the mobile device 104 desires to provision at least one of its subscriber account and/or communication address (e.g., IMSI, telephone number, and so forth) to the IoT device 102, as illustrated in block 116.

The server(s) 106 can receive the token from the mobile device 104, as illustrated in block 118. The server(s) 106 can receive the token from the IoT device 102, as illustrated in block 120. The server(s) 106 can compare the token received from the mobile device 104 with the token received from the IoT device 102 to determine whether the tokens match (i.e., include a same identifier), as illustrated in block 122. In at least one example, the server(s) 106 can authenticate the IoT device 102 based on the tokens matching. Based at least in part on determining that the tokens match, as illustrated in block 124, the server(s) 106 can provision device and/or line sharing capabilities to the IoT device 102, as illustrated in block 126. That is, the server(s) 106 can program a profile associated with an eSIM card embedded in the IoT device 102 such that the profile can be associated with the same subscriber account, communication address, and so forth as the mobile device 104. Accordingly, the IoT device 102 can receive device and/or line sharing capabilities, as illustrated in block 128.

As such, when mobile device 104 receives incoming call(s) and message(s) that are sent to the common communication address(es), IoT device 102 can receive the same incoming call(s) and message(s), and either the IoT device 102 and/or the mobile device 104 can answer the incoming call(s) and/or interact with the incoming message(s). That is, based on receiving the device and/or line sharing capabilities, IoT device 102 becomes a related device to mobile device 104.

In at least one example, the mobile device 104 can provide the IoT device 102 with data indicating the subscriber account and/or communication address prior to the IoT device 102 receiving device and/or line sharing capabilities from the server(s) 106. That is, in some examples, the mobile device 104 can provision the IoT device 102 with data indicating the subscriber account and/or communication address and the IoT device 102 may not receive device and/or line sharing capabilities until the server(s) 106 provision such capabilities. In other examples, the IoT device 102 can receive data indicating the subscriber account and/or communication address from the server(s) 106 in association with receiving the device and/or line sharing capabilities.

Figure 2:
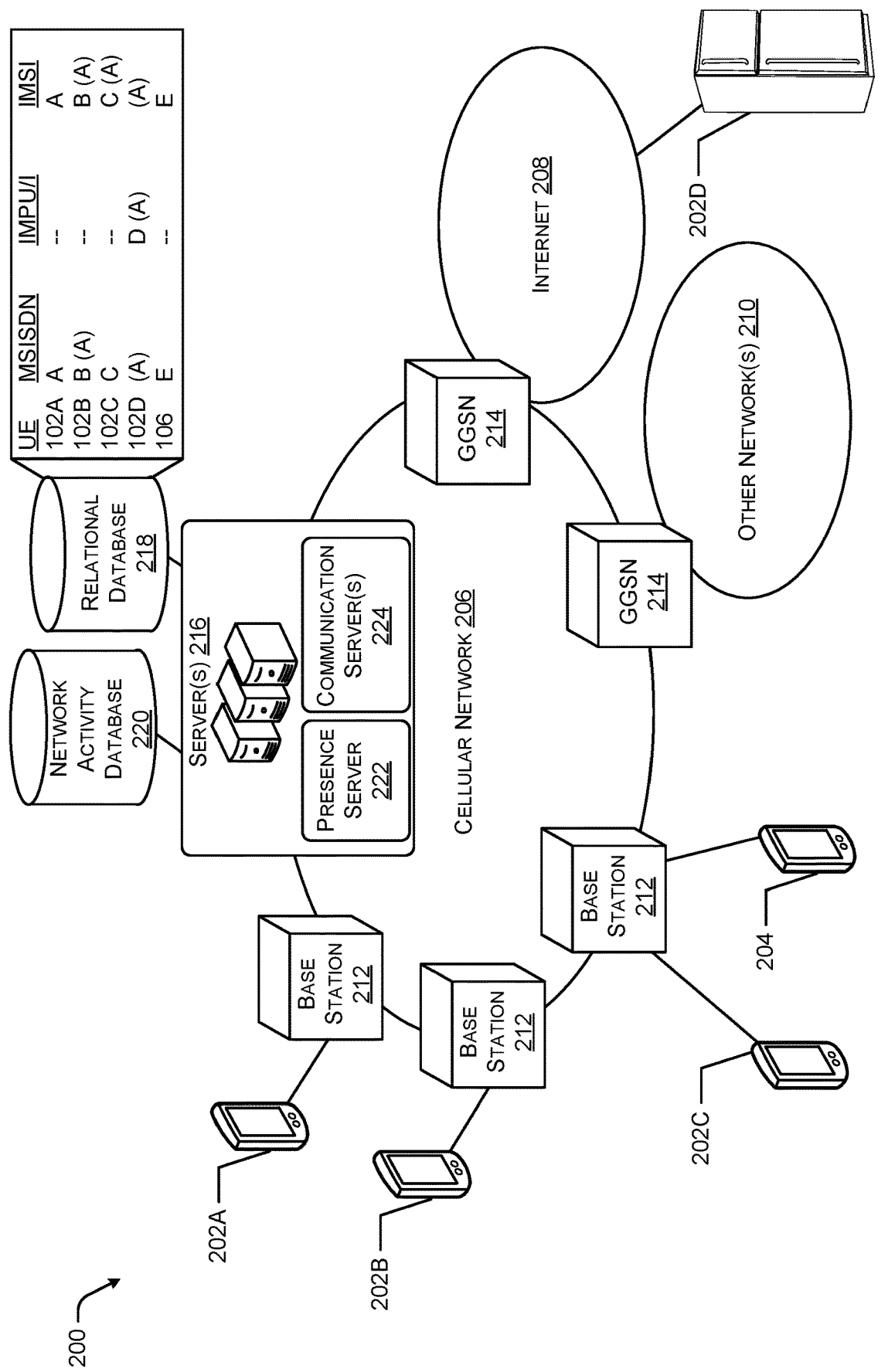
FIG. 2 illustrates an environment for provisioning device and/or line sharing capabilities to IoT devices.

FIG. 2 illustrates an environment 200 for provisioning device and/or line sharing capabilities to IoT devices.

In environment 200, device 202A, device 202B, device 202C, and device 202D are examples of related devices (collectively, related devices 202) that share a subscriber account (e.g., account), communication address (e.g., line), etc. As described above, in at least one example, a communication (e.g., a call, a message, etc.) initiated by an external device 204 can be sent to a contained grouping of related devices, such as related devices 202. That is, each of the related devices 202 can receive a communication from the external device 204, and other devices that do not share an account, line, etc. are not permitted to receive the communication. While four related devices are shown in FIG. 2, any number of devices can be related so long as they share at least one of a line or an account with another device. Furthermore, while related devices 202A-202C are illustrated as mobile devices (e.g., mobile device 104) and related device 202D is illustrated as an IoT device (e.g., IoT device 102), related devices 202 can be any type of device as described herein (e.g., IoT devices (e.g., IoT device 102), mobile devices (e.g., mobile device 104), etc.).

In at least one example, a related device (e.g., device 202A) communicates with an external device (e.g., device 204) and/or one or more related devices (e.g., device 202B, device 202C, and/or device 202D) via a cellular network 206, the Internet 208, and/or one or more other networks 210. The cellular network 206, the Internet 208, and/or the one or more other networks 210 can correspond to network(s) 108 with reference to FIG. 1. In at least one example, device 202A, device 202B, device 202C, and/or device 204 can connect to the cellular network 206 via a corresponding base station 212. The cellular network 206 can be responsible for routing voice communication to other networks 210, as well as routing data communication to external packet switched networks, such as the Internet 208. For example, the cellular network 206 can include a Gateway GPRS Support Node (GGSN) 214 or another equivalent node. Some related devices (e.g., device 202D) may not be capable of connecting through a base station 212 of the cellular network 206 but can register with the cellular network 206 through the Internet 208, described below.

In at least one example, each of the related devices (e.g., device 202A, device 202B, device 202C, and/or device 202D) and the external device 204 can correspond to user equipment (UE). The UE can include, but is not limited to, one or more of a smartphone, a personal digital assistant, a netbook, a laptop computer, a smart device, and/or another electronic device that is capable of sending or receiving voice, video, and/or data via the cellular network 206, the Internet 208, and/or one or more other network(s) 210 (e.g., a Wi-Fi network, another access network, a short-range communication network, etc.). In an example where a UE is a mobile device, the mobile device can include a SIM card, which has an international mobile subscriber identity (IMSI) stored thereon and/or associated with a profile corresponding to the SIM card. As described above, in some examples, the SIM card can be an eSIM card.

An IMSI is a unique 64-bit number. Within a GSM network, the IMSI is associated with the MSISDN, sometimes referred to as the "Mobile Station International Subscriber Directory Number," or more commonly as the telephone number. The MSISDN is a unique number that identifies a subscription on a GSM network and is also the number that can be used to place a call to the GSM phone. The MSISDN is not necessarily stored on the SIM card or the phone, and the MSISDN is not permanently associated with the IMSI. The MSISDN can change if the subscription changes, for example.

In some examples, multiple UEs are registered with a common number (e.g., MSISDN, IMPU, IMPI, etc.) ("line," as used herein) and/or are associated with a common subscriber account (e.g., IMSI) ("account," as used herein), and thus are "related devices," as used herein. For example, some of the related devices (e.g., device 202A, device 202B, and/or device 202C) can have their own unique IMSI programmed into their respective SIM cards, and which are associated with a specific telephone number (MSISDN), which can also be unique to each related device (e.g., device 202A, device 202B, and/or device 202C). But the IMSI and MSISDN pair can be associated in the network with "alias numbers" to allow for shared lines and/or shared accounts, thereby making them related devices.

In some examples, a related device (e.g., device 202D) can include a SIM card, but a profile associated with the SIM card may not have data indicating an IMSI stored thereon. As described above, in some examples, the SIM card can be an eSIM card. In at least one example, the server(s) 216 can facilitate provisioning data indicating an IMSI to a profile associated with the eSIM card of the related device (e.g., device 202D) to provision device and/or line sharing capabilities. That is, prior to receiving data associated with a subscriber account and/or a communication address via techniques described herein, device 202D may not be a related device. However, after receiving data associated with a subscriber account and/or a communication address via techniques described herein, device 202D can be a related device.

Some related devices (e.g., device 202D), which may not be capable of connecting through a base station 212 of the cellular network 206, can register with the cellular network 206 through the Internet 208 using a unique identifier, such as an IMPI or IMPU, a globally routable user agent URI (GRUU), or other identifier. In at least one example, these identifiers can take the form of a telephone number (e.g., they can resemble a MSISDN). The cellular network 206 forwards calls and/or messages to the device 202D, and the device 202D can be enabled to send or receive calls and/or messages in a same or similar way as with other related devices (e.g., device 202A, device 202B, device 202C, and/or device 202D).

It should be noted that, while device 202D is illustrated as an IoT device that is not capable of connecting through a base station 212, in alternate examples, so long as an IoT device includes radio hardware, an IoT device can connect through a base station 212.

In at least one example, line and/or account associations for related devices (e.g., device 202A, device 202B, device 202C, and/or device 202D) can be stored in a relational database 218. Non-limiting examples of the IMSI and MSISDN associations for related devices (e.g., device 202A, device 202B, device 202C, and/or device 202D) are depicted in relational database 218. For instance, device 202A is associated with IMSI A and MSISDN A. Device 202B is associated with IMSI B and MSISDN B, but also with alias MSISDN A and alias IMSI A. Thus, device 202B is associated both with the same account and with the same line as device 202A. Device 202C is associated with IMSI C and MSISDN C, but also with alias IMSI A. Thus, device 202C shares an account (IMSI A) but not a telephone line with device 202A. As illustrated in relational database 218, device 202D is associated with IMPU D and also with alias IMPU A. Device 202D therefore shares a telephone line with devices 202A and device 202B and an account with device 202A, device 202B, and device 202C.

In addition to the relational database 218, the cellular network 206 can be associated with a network activity database 220. The network activity database 220 can include entries corresponding to communications associated with the related devices (e.g., device 202A, device 202B, device 202C, and/or device 202D) and/or other devices (e.g., external device 204) that communicate via the cellular network 206. Each of the entries can indicate a type of a communication, a time the communication is sent, a time the communication is received, devices associated with the communication, etc. In some examples, the network activity database 220 can store additional and/or alternate data including data associated with contacts, etc.

The relational database 218 and the network activity database 220 can be associated with server(s) 216. In various embodiments, each of the server(s) 216 can be any type of server, such as a network-accessible server. Server(s) 216 can correspond to server(s) 106, as illustrated in FIG. 1. In various examples, each of the server(s) 216 can be associated with one or more processor(s) and computer-readable media, which can execute one or more modules and/or processes to cause the server(s) 216 to perform a variety of functions, as set forth above and explained in further detail with reference to FIG. 5 below.

In at least one example, the server(s) 216 can include a presence server 222 and one or more communication servers 226. The presence server 222 can retrieve data that corresponds to the MSISDN, IMSI, IMPU/IMPI, etc. of the related devices (e.g., device 202A, device 202B, device 202C, and/or device 202D) from the relational database 218. The data can include information specifying the associated device number (e.g., a MSISDN, IMPI, IMPU, IMSI, or the like) for which the related devices (e.g., device 202A, device 202B, device 202C, and/or device 202D) are able to utilize for initiating, sending, and/or receiving communications. Thus, the presence information provided to a related device (e.g., device 202A) regarding one or more of the other related devices (e.g., device 202B, device 202C, and/or device 202D), which can indicate the shared line or account (e.g., can indicate whether and how the devices are related devices), can enable the related device (e.g., device 202A) to recognize that the other related devices (e.g., device 202B, device 202C, and/or device 202D) are related devices that share the same account and/or line as the device 202A, as well as to distinguish devices that are not related devices (such as device 204). In some examples, a related device (e.g., device 202A) can request, from the presence server 222, a list of related devices (e.g., device 202B, device 202C, and/or device 202D).

In at least one example, a related device (e.g., device 202A) can be configured to obtain presence information for one or more contacts, including the related devices (e.g., device 202B, device 202C, and/or device 202D), from the presence server 222. The presence server 222 can be a SIP server, and the related device (e.g., device 202A) can be configured to utilize OMA Presence SIMPLE to obtain presence information regarding one or more contacts, including the related devices (e.g., device 202B, device 202C, and/or device 202D). In some examples, a related device (e.g., device 202A) can utilize presence information to determine which contacts correspond to related devices. For example, the presence information can include information about telephone numbers with which the mobile devices are registered. A related device (e.g., device 202A) can utilize the presence information—including for example an IP address or other information—to establish a connection with the related devices (e.g., device 202B, device 202C, and/or device 202D).

In some examples, the related devices (e.g., device 202A, device 202B, device 202C, and/or device 202D) can be configured to provide their presence information to the presence server 222. Additionally and/or alternately, the related devices (e.g., device 202A, device 202B, device 202C, and/or device 202D) can be configured to provide capabilities information to the presence server 222. The capabilities information can indicate an ability to receive calls, receive messages, receive shared content, receive shared video conversations, receive communication notifications, and so forth. In other examples, the related devices (e.g., device 202A, device 202B, device 202C, and/or device 202D) can obtain each other's presence information and/or capabilities information in other ways, such as through static configuration, peer-to-peer connections, and so forth.

The communication server(s) 224 can facilitate sending and receiving communications. In at least one example, the communication server(s) 224 include a telephony application server that can be used for voice, message, and video communications via the cellular network 206, Internet 208, and/or other network(s) 210.

Figure 3:
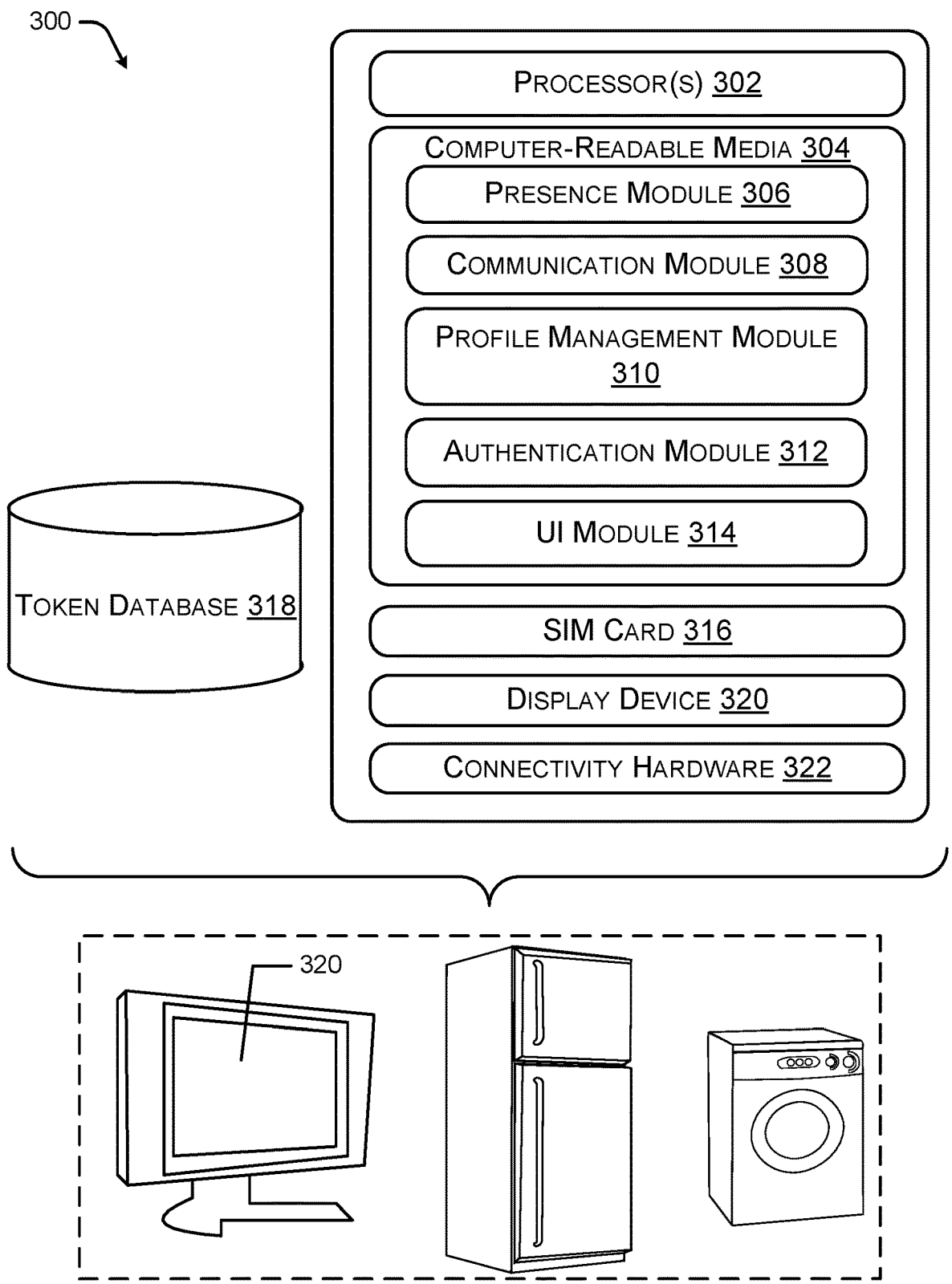
FIG. 3 illustrates an example IoT device configured to be provisioned with device and/or line sharing from one or more serving devices.

FIG. 3 illustrates an example IoT device 300 configured to receive device and/or line sharing capabilities as described herein. IoT device 300 can correspond to IoT device 102 and/or any one of related devices (e.g., device 202A, device 202B, device 202C, and/or device 202D); however, for the purpose of this discussion, IoT device 300 corresponds to device 202D. As illustrated in FIG. 3, the IoT device 300 includes processor(s) 302 and computer-readable media 304.

Processor(s) 302 can represent, for example, a CPU-type processing unit, a GPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 302 can execute one or more modules and/or processes to cause the IoT device 300 to perform a variety of functions, as set forth above and explained in further detail in the following disclosure. Additionally, each of the processor(s) 302 can possess its own local memory, which also can store program modules, program data, and/or one or more operating systems.

Depending on the exact configuration and type of the IoT device 300, the computer-readable media 304, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. Computer-readable media 304 is an example of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the IoT device 300. Any such non-transitory computer-readable media can be part of the IoT device 300.

In contrast, communication media includes computer readable instructions, data structures, program modules, or other data in a modulated data signal, such as a carrier wave, or other transmission mechanism. As defined herein, computer storage media does not include communication media.

The computer-readable media 304 can include one or more modules and data structures including, for example, a presence module 306, a communication module 308, a profile management module 310, an authentication module 312, and/or a user interface (UI) module 316. The one or more modules and data structures can be in the form of stand-alone applications, productivity applications, an operating system component, or any other application or software module having data items that facilitate interactions between related devices (e.g., device 202A, device 202B, device 202C, and/or device 202D), external device(s) (e.g., device 204), the server(s) 216, and/or one or more networks (e.g., cellular network 206, Internet 208, other network(s) 210, etc.), as described herein.

The presence module 306 can be configured to retrieve presence information associated with one or more related devices (e.g., device 202A, device 202B, device 202C, and/or device 202D). As described above, presence information obtained from the presence server 222 can be utilized to identify related devices (e.g., device 202A, device 202B, device 202C, and device 202D). The presence module 306 can be configured to retrieve the presence information from the presence server 222, such as via OMA Presence SIMPLE protocol, or in some other fashion, as described above. In at least one example, the presence module 306 can provide presence information to the presence server 222. Additionally and/or alternately, presence module 306 can be configured to provide capabilities information, described above, to the presence server 222. In some examples, the presence module 306 can be provisioned to the IoT device 300 in association with the IoT device 300 being provisioned with device and/or line sharing capabilities.

The communication module 308 can facilitate communications between the IoT device 300 and one or more other related devices (e.g., device 202A, device 202B, and device 202C) and/or an external device 204. For instance, the communication module 308 can facilitate sending calls, messages, etc. to one or more other related devices (e.g., device 202A, device 202B, and device 202C) and/or an external device 204 and/or receiving calls, messages, etc. from one or more other related devices (e.g., device 202A, device 202B, and device 202C) and/or an external device 204. In some examples, the communication module 308 can be provisioned to the IoT device 300 in association with the IoT device 300 being provisioned with device and/or line sharing capabilities.

The profile management module 310 can provide local profile services such as downloading data to add to a profile associated with a SIM card 316 and/or managing the profile. In at least one example, IoT device 300 can include a SIM card 316. As described above, the SIM card 316 can be an eSIM card. In such examples, the eSIM card can be associated with a profile that can be programmed by a remote device (e.g., another device and/or server(s)). The profile can be used to identify (and authenticate) the IoT device 300. In at least one example, the profile management module 310 can receive profile data associated with the eSIM card from a remote device. The profile data can indicate operator information, telecommunications service provider information, etc. The profile management module 310 can receive profile data and can store the profile data in association with the profile of the eSIM card. Furthermore, as described herein, in at least one example, the profile management module 310 can receive data associated with a subscriber account, a communication address, etc. from a remote device and can associate such data with the profile.

The authentication module 312 can be configured to authenticate the IoT device 300 to enable provisioning of device and/or line sharing to the IoT device 300. In at least one example, the authentication module 312 can receive data that includes an identifier from a mobile device (e.g., mobile device 104). Such data may be described herein as a "token." In some examples, the authentication module 312 can send a request to the mobile device (e.g., mobile device 104) for the token. In other examples, the authentication module 312 can receive the token without having requested such information. In at least one example, the authentication module 312 can receive data indicating a subscriber account and/or a communication address associated with the mobile device (e.g., mobile device 104) in addition to the token. In some examples, the token and/or data indicating a subscriber account and/or a communication address associated with the mobile device (e.g., mobile device 104) can be provisioned to the authentication module 312 via a short-range communication network (e.g., Bluetooth®, Near Field Communication (NFC), etc.).

In at least one example, the authentication module 312 can store the token in a token database 318. The token database 318 can be configured to store tokens temporarily until the authentication module 312 sends the token to the one or more servers (e.g., server(s) 106), as described below.

The authentication module 312 can provide the token to the server(s) (e.g., server(s) 106). In at least one example, the authentication module 312 can receive a request for the token and, responsive to receiving the request, the authentication module 312 can access the token from the token database 318 and can send the token to the server(s) (e.g., server(s) 106). In alternate examples, the authentication module 312 can send the token to the server(s) (e.g., server(s) 106) without being prompted for such information. In at least one example, the token can be provisioned to the server(s) (e.g., server(s) 106) via a long-range communication network (e.g., wi-fi, cellular, radio, etc.).

In the examples provided above, the authentication module 312 can receive a token from a mobile device (e.g., mobile device 104) and can provide the token to the server(s) (e.g., sever(s) 106) in an effort to authenticate the IoT device 300 for receiving device and/or line sharing capabilities. However, in an alternate example, the authentication module 312 can provide a token to a mobile device (e.g., mobile device 104) and the mobile device can send the token with the request to provision its subscriber account and/or communication address to the IoT device 300. In some examples, the authentication module 312 can provide the token to the mobile device (e.g., mobile device 104) responsive to a request for the token. In other examples, the authentication module 312 can provide the token to the mobile device (e.g., mobile device 104) without a request for such information. In such an example, the authentication module 312 can independently send the token to the server(s) (e.g., server(s) 106) in an effort to authenticate the IoT device 300 for receiving device and/or line sharing capabilities.

In at least one example, based at least in part on sending the token and the server(s) (e.g., server(s) 106) authenticating the IoT device 300, the authentication module 312 can receive data to effectuate device and/or line sharing capabilities. For instance, in at least one example, the authentication module 312 can receive data enabling the IoT device 300 to access the functionality of the presence module 306 and/or the communication module 308. As a result, the communication module 308 can facilitate sending calls, messages, etc. to one or more other related devices (e.g., device 202B, device 202C, and device 202D) and/or an external device 204 and/or receiving calls, messages, etc. from one or more other related devices (e.g., device 202B, device 202C, and device 202D) and/or an external device 204. That is, as a result, the IoT device 300 can receive device and/or line sharing capabilities.

In at least some examples, IoT device 300 can include a UI module 314, as described above. IoT devices such as televisions, refrigerators, etc. can include a display device 320 for presenting content to users. In such examples, the UI module 314 can be configured to cause a presentation of graphical representation(s) via a display device 320 associated with the IoT device 300. In at least one example, the UI module 314 can generate a graphical user interface that can be presented via the display device 320. For instance, the UI module 314 can generate and present a notification that a mobile device (e.g., mobile device 104) is attempting to provision device and/or line sharing capabilities with the IoT device 300. Or, the UI module 314 can receive a notification that the IoT device 300 has been provisioned with device and/or line sharing capabilities and can present a notification indicating such.

IoT device 300 can further include a SIM card 316. As described above, a SIM card 316 can be configured to store data associated with a profile that can be used to identify (and authenticate) the IoT device 300. A SIM card 316 can be a portable memory chip or an embedded memory chip (eSIM). In examples where the SIM card 316 is an eSIM card, the profile can be programmed via a remote device, as described above.

Additionally, as described above, in some examples, IoT device 300 can include a display device 320. A display device 320 can be an output device for visually presenting data. Examples of display devices include light-emitting diode (LED) displays, liquid crystal displays (LCD), cathode ray tube (CRT) displays, etc.

In at least one example, connectivity hardware 322 can include network hardware, which provides wired or wireless networking capabilities to the IoT device 300. The network hardware can include or be incorporated into processors, application-specific integrated circuits (ASICs), programmable circuits such as field programmable gate arrays (FPGAs), or in other ways. The software modules stored on the computer-readable media 404 are configured to access hardware via interrupts, calling APIs, and the like. The software modules can also be configured to pass information to one another, such as through APIs, storing commands, parameters, etc. in a predetermined memory location, etc. Other examples are possible without departing from the scope of this disclosure.

In additional and/or alternate examples, the connectivity hardware 322 can include radio hardware, which provides wireless UE capabilities, such as connecting to a cellular network base station, a Wi-Fi network, or other wireless networks. The radio hardware can include or be incorporated into processors, application-specific integrated circuits (ASICs), programmable circuits such as field programmable gate arrays (FPGAs), or in other ways. The software modules stored on the computer-readable media 304 are configured to access hardware via interrupts, calling APIs, and the like. The software modules can also be configured to pass information to one another, such as through APIs, by storing commands, parameters, etc. in a predetermined memory location, etc. Other examples are possible without departing from the scope of this disclosure.

Figure 4:
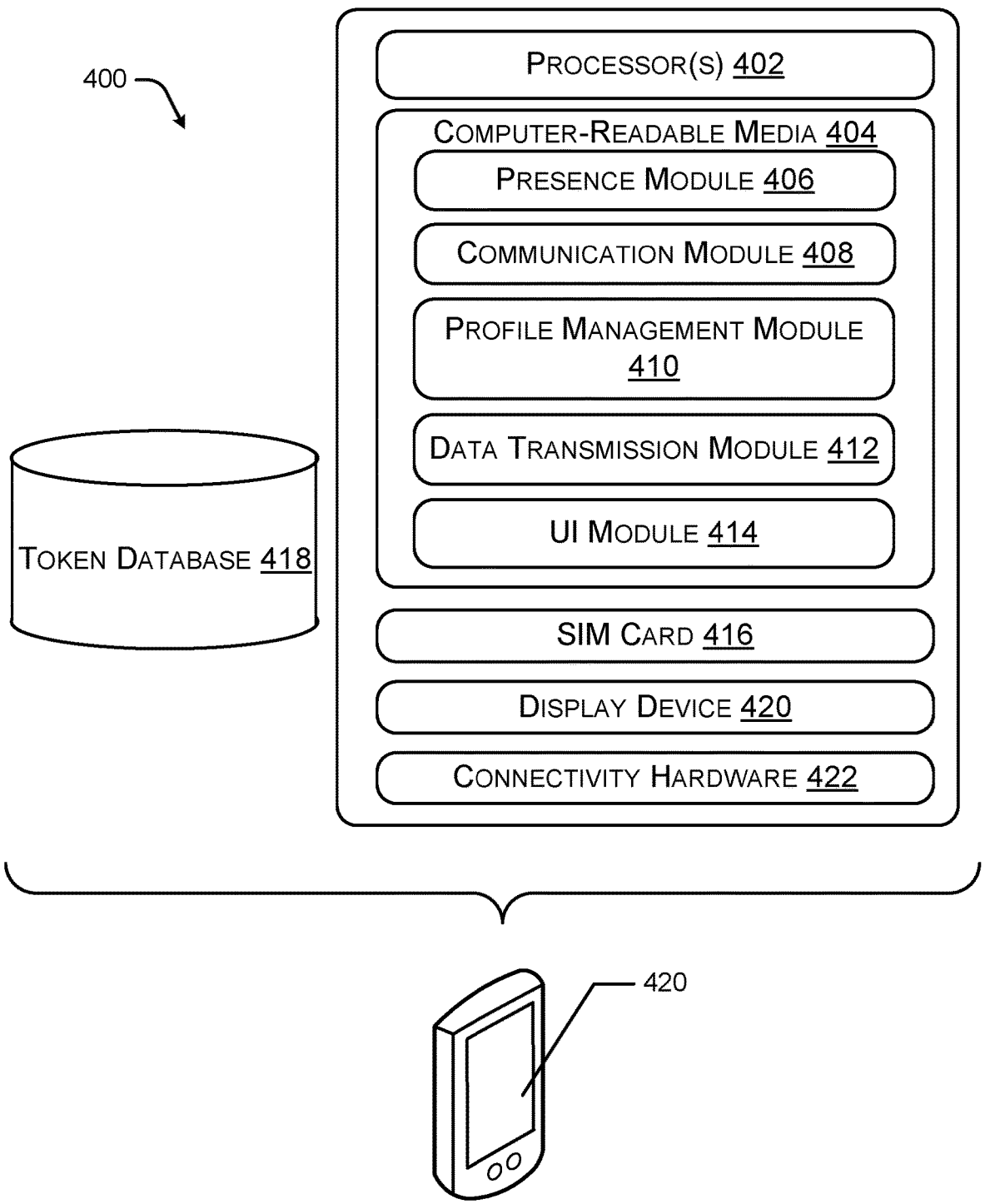
FIG. 4 illustrates an example mobile device configured to enable provisioning device and/or line sharing capabilities to IoT devices.

FIG. 4 illustrates an example mobile device 400 configured to provision device and/or line sharing capabilities to an IoT device (e.g., IoT device 300), as described herein. Mobile device 400 can correspond to mobile device 104 and/or any one of related devices (e.g., device 202A, device 202B, device 202C, and/or device 202D); however, for the purpose of this discussion, mobile device 400 corresponds to device 202A. As illustrated in FIG. 4, the mobile device 400 includes processor(s) 402 and computer-readable media 404. Processor(s) 402 can have the same or similar functionality as processor(s) 302 and computer-readable media 404 can have the same or similar functionality as computer-readable media 304.

The computer-readable media 404 can include one or more modules and data structures including, for example, a presence module 406, a communication module 408, a profile management module 410, an data transmission module 412, and/or a user interface (UI) module 416. The one or more modules and data structures can be in the form of stand-alone applications, productivity applications, an operating system component, or any other application or software module having data items that facilitate interactions between related devices (e.g., device 202A, device 202B, device 202C, and/or device 202D), external device(s) (e.g., device 204), the server(s) 216, and/or one or more networks (e.g., cellular network 206, Internet 208, other network(s) 210, etc.), as described herein.

The presence module 406 can be configured to retrieve presence information associated with one or more related devices (e.g., device 202A, device 202B, device 202C, and/or device 202D). As described above, presence information obtained from the presence server 222 can be utilized to identify related devices (e.g., device 202A, device 202B, device 202C, and device 202D). The presence module 406 can be configured to retrieve the presence information from the presence server 222, such as via OMA Presence SIMPLE protocol, or in some other fashion, as described above. In at least one example, the presence module 406 can provide presence information to the presence server 222. Additionally and/or alternately, presence module 406 can be configured to provide capabilities information, described above, to the presence server 222.

The communication module 408 can facilitate communications between the mobile device 400 and one or more other related devices (e.g., device 202B, device 202C, and device 202D) and/or an external device 204. For instance, the communication module 408 can facilitate sending calls, messages, etc. to one or more other related devices (e.g., device 202B, device 202C, and device 202D) and/or an external device 204 and/or receiving calls, messages, etc. from one or more other related devices (e.g., device 202B, device 202C, and device 202D) and/or an external device 204.

The profile management module 410 can provide local profile services such as downloading data to add to a profile associated with a SIM card 416 and/or managing the profile. In at least one example IoT device 400 can include a SIM card 416. As described above, the SIM card 416 can be an eSIM card. In such examples, the eSIM card can be associated with a profile that can be programmed by a remote device (e.g., another device and/or server(s)). The profile can be used to identify (and authenticate) the mobile device 400. In at least one example, the profile management module 410 can receive profile data associated with the eSIM card from a remote device. The profile data can indicate operator information, telecommunications service provider information, etc. The profile management module 410 can receive profile data and can store the profile data in association with the profile of the eSIM card. Furthermore, as described herein, in at least one example, the profile management module 410 can receive data associated with a subscriber account, a communication address, etc. from a remote device and can associate such data with the profile.

The data transmission module 412 can be configured to communicate with an IoT device 300 and one or more servers (e.g., server(s) 106) to provision device and/or line sharing capabilities to the IoT device 300. In at least one example, the data transmission module 412 can provision a token to an IoT device 300. As described above, the token can be associated with an identifier. In some examples, the data transmission module 412 can provision the token responsive to a request from the IoT device 300. In other examples, the data transmission module 412 can provision the token without receiving a request for such information.

In some examples, the data transmission module 412 can provision an IoT device 300 with data indicating the subscriber account and/or the communication address associated with the mobile device 400. However, in such examples, an IoT device 300 may not have device and/or line sharing capabilities until the server(s) (e.g., server(s) 106) provision the IoT device with such capability. That is, in at least one example, the data transmission module 412 can provision the IoT device with data indicating the subscriber account and/or the communication address associated with the mobile device 400, but the IoT device 300 may not have device and/or line sharing capabilities until the server(s) (e.g., server(s) 106) provision the IoT device with such capabilities. In at least one example, the data transmission module 412 can provision the IoT device 300 with data indicating the subscriber account and/or the communication address associated with the mobile device 400 at a same time, or at a similar time, as the mobile device 400 sends the token to the IoT device 300.

In some examples, the token and/or data indicating a subscriber account and/or a communication address associated with the mobile device 400 can be provisioned to the IoT device 300 via a short-range communication network (e.g., Bluetooth®, Near Field Communication (NFC), etc.).

In an alternate example, the data transmission module 412 can receive a token from an IoT device 300. For instance, in some examples, the data transmission module 412 can send a request to the IoT device 300 for a token. The data transmission module 412 can receive a token from the IoT device 300 responsive to the request. In alternate examples, the data transmission module 412 can receive a token from the IoT device 300 without prompting the IoT device 300 for such information. In at least one example, the data transmission module 412 can store the token in a token database 418. The token database 418 can be configured to store tokens temporarily until the data transmission module 412 sends the token to the one or more servers (e.g., server(s) 106), as described below.

In at least one example, the data transmission module 412 can send a request to one or more servers (e.g., server(s) 106). The request can indicate that the mobile device 400 desires to provision its subscriber account and/or communication address to an IoT device 300. The request can also include the token to identify which IoT device the mobile device 400 desires to provision the device and/or line sharing capabilities. That is, the data transmission module 412 can access the token from the token database 418 and send the token with the request. In some examples, the request can also include data indicating the subscriber account and/or the communication address. That is, in some examples, the data transmission module 412 can access the profile associated with the SIM card 416 and can send data indicating the subscriber account and/or the communication address associated with the mobile device 400 to the server(s) (e.g., server(s) 106).

In at least some examples, mobile device 400 can include a UI module 414, as described above. In such examples, the UI module 414 can be configured to cause a presentation of graphical representation(s) via a display device 420 associated with the mobile device 400. In at least one example, the UI module 414 can generate a graphical user interface that can be presented via the display device 420. For instance, the UI module 414 may present a prompt to a user to confirm that he or she desires to provision a token and/or data indicating its subscriber account and/or communication address to the IoT device 300. Or, the UI module 414 may present a prompt to a user to initiate a request for a token from the IoT device 300. In some examples, the UI module 414 can receive an indication that an IoT device 300 has been provisioned with device and/or line sharing capabilities and the UI module 414 can present a notification to a user that the IoT device 300 has been provisioned with device and/or line sharing capabilities via the display device 420.

Mobile device 400 can further include a SIM card 416. As described above, a SIM card 416 can store data associated with a profile that can be used to identify (and authenticate) the mobile device 400. A SIM card 416 can be a portable memory chip or an embedded memory chip (eSIM). In examples where the SIM card 416 is an eSIM card, the profile can be programmed via a remote device, as described above. In at least one example, the eSIM card can be programmed with a profile associating the eSIM card (and thus mobile device 400) with a telecommunication service provider, a subscriber account, a communication address, etc.

Display device 420 can be an output device for visually presenting data. Examples of display devices include LED displays, LCD, CRT displays, etc.

In at least one example, connectivity hardware 422 can include network hardware and/or radio hardware as described above with respect to connectivity hardware 322. That is, connectivity hardware 422 can have the same or similar functionality as connectivity hardware 322.

Figure 5:
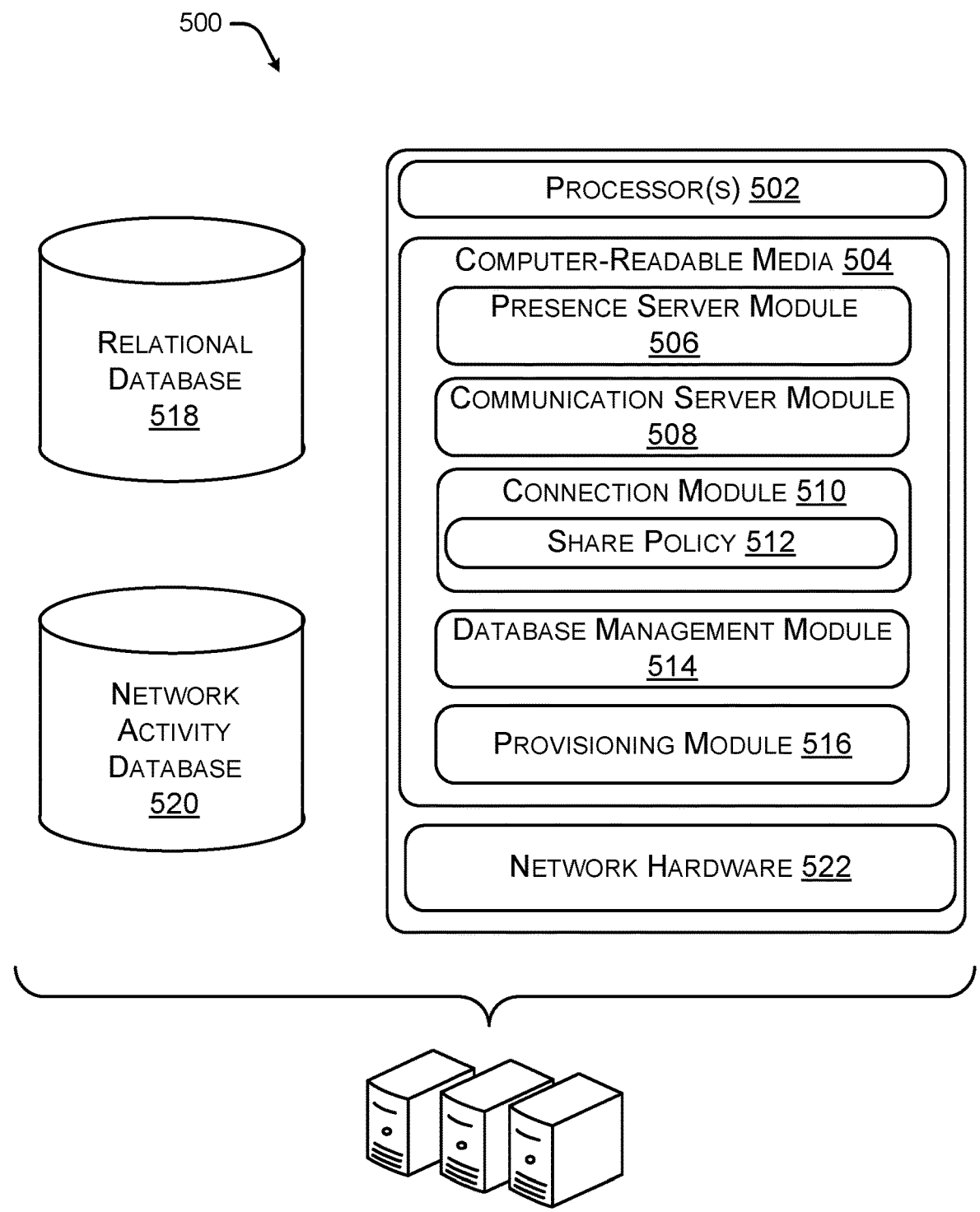
FIG. 5 illustrates example server(s) configured to provision device and/or line sharing to IoT devices.

FIG. 5 illustrates example server(s) 500 configured to provision device and/or line sharing capabilities to IoT device(s) (e.g., IoT device 300). In at least one example, servers 500 can correspond to server(s) 106, as described above with reference to FIG. 1, and/or server(s) 216, described above with reference to FIG. 2. As illustrated in FIG. 5, the server(s) 500 include processor(s) 502 and computer-readable media 504. Processor(s) 502 can have the same or similar functionality as processor(s) 302 and computer-readable media 504 can have the same or similar functionality as computer-readable media 304.

The computer-readable media 504 can include one or more modules and data structures including, for example, a presence server module 506, a communication server module 508, a connection module 510, including a share policy 512, a database management module 514, and a provisioning module 516. The one or more modules and data structures can be in the form of stand-alone applications, productivity applications, an operating system component, or any other application or software module having data items that facilitate interactions between the server(s) 500, one or more related devices (e.g., device 202A, device 202B, device 202C, and/or device 202D), and/or one or more networks (e.g., cellular network 206, Internet 208, and/or other network(s) 210), as described herein.

The presence server module 506 can provide presence server services to devices, including the related devices (e.g., device 202A, device 202B, device 202C, and/or device 202D). The presence server module 506 can be configured to register online presence information of various devices, and/or to provide presence information and/or capabilities information, as described above, regarding the various devices. The presence server module 506 can look up information regarding groups of related devices in a relational database 518, described below, and provide presence information and/or capabilities information regarding those related devices (e.g., device 202A, device 202B, device 202C, and/or device 202D) to other ones of the related devices (e.g., device 202A, device 202B, device 202C, and/or device 202D). The presence server module 506 can be configured to provide presence information and/or capabilities information using OMA Presence SIMPLE protocol, or in some other fashion.

The communication server module 508 can provide communication server services to devices, including the related devices (e.g., device 202A, device 202B, device 202C, and/or device 202D) and/or external devices (e.g., device 204). That is, the communication server module 508 can facilitate sending and receiving calls, messages, etc. to and/or from the related devices (e.g., device 202A, device 202B, device 202C, and/or device 202D) and/or external devices (e.g., device 204). In at least one example, the communication server module 508 can receive a communication and can route the communication to the intended recipient based on the communication address associated with the communication.

The connection module 510 can be configured, in some embodiments, to facilitate establishment of connections between devices, including establishment of connections between related devices (e.g., device 202A, device 202B, device 202C, and/or device 202D). In some examples, the connection module 510 can be configured to utilize a share policy 512. The share policy 512 can be based at least in part on presence information, capabilities information, and/or preference information. The share policy 512 can indicate that certain communications can be shared with related devices (e.g., device 202A, device 202B, device 202C, and/or device 202D), and that such communications can not to be shared with other devices that do not share a line or account. In other examples, the share policy 512 can indicate that certain communications can be shared with certain related devices (e.g., device 202A, device 202B, device 202C, and/or device 202D), and that such communications can not to be shared with other related devices (e.g., device 202A, device 202B, device 202C, and/or device 202D). The connection module 510 can therefore allow certain communications to be shared with certain related devices (e.g., device 202A, device 202B, device 202C, and/or device 202D), but deny requests to share communications with other devices.

The database management module 514 can be configured to manage a relational database 518 and/or a network activity database 520. In at least one example, the server(s) 500 can be associated with a relational database 518 and a network activity database 520. In some examples, the relational database 518 and/or the network activity database 520 can be integral to the server(s) 500. In other examples, the relational database 518 and/or the network activity database 520 can be communicatively coupled to the server(s) 500. In at least one example, the relational database 518 can correspond to the relational database 218 described above with reference to FIG. 2 and the network activity database 520 can correspond to the network activity database 220 described above with reference to FIG. 2. That is, the relational database 518 can store line and/or account associations for related devices (e.g., device 202A, device 202B, device 202C, and/or device 202D) and the network activity database 520 can store entries corresponding to communications associated with the related devices (e.g., device 202A, device 202B, device 202C, and/or device 202D) and/or other devices (e.g., external device 204).

In at least one example, the database management module 514 can define the relational database 518 and/or the network activity database 520, create the relational database 518 and/or the network activity database 520, receive and/or determine data that is stored in the relational database 518 and/or the network activity database 520, analyze the data that is stored in the relational database 518 and/or the network activity database 520, update the data that is stored in the relational database 518 and/or the network activity database 520, and otherwise administer the relational database 518 and/or the network activity database 520.

Provisioning module 516 can receive a request from a mobile device 400. As described above, the request can include a token, which can include an identifier, and an indication that the mobile device 400 desires to provision an IoT device 300 with device and/or line sharing capabilities based on the subscriber account and/or communication address associated with the mobile device 400. In some examples, the request can include data indicating the subscriber account and/or communication address associated with the mobile device 400. In other examples, if the request does not include data indicating the subscriber account and/or communication address associated with the mobile device 400, the provisioning module 516 can access the relational database 518 to determine the subscriber account and/or communication address associated with the mobile device 400. In such examples, the request can be associated with data identifying the mobile device 400.

Additionally, the provisioning module 516 can receive a token from the IoT device 300. That is, in at least one example, the IoT device 300 can send a token to the server(s) 500. As described above, in some examples, the IoT device 300 can provide the token to the server(s) 500 responsive to a request for the token. In other examples, the IoT device 300 can provide the token to the server(s) 500 without a request for the token.

The provisioning module 516 can compare the token received from the mobile device 400 with the token received from the IoT device 300. That is, in at least one example, the provisioning module 516 can authenticate the IoT device 300 based at least in part on comparing the tokens. Based at least in part on the tokens being associated with a same identifier, the provisioning module 516 can provision device and/or line sharing capabilities to the IoT device 300. In at least one example, the provisioning module 516 can instruct the database management module 514 to update the relational database 518 to indicate that the IoT device 300 is associated with the subscriber account and/or communication address of the mobile device 400. In such examples, the database management module 514 can update the relational database 518 to indicate that the IoT device 300 is associated with the subscriber account and/or communication address associated with the mobile device 400.

In at least one example, the provisioning module 516 can provide the subscriber account and/or communication address associated with the mobile device 400 to the IoT device 300. In additional and/or alternate examples, the mobile device 400 may have already provisioned the IoT device 300 with the subscriber account and/or communication address. In either example, the provisioning module 516 can provision the device and/or line sharing capabilities. For instance, in at least one example, the provisioning module 516 can send data enabling the IoT device 300 to access the functionality of the presence server module 506 (via the presence module 306) and/or the communication server module 508 (via the communication module 308). As a result, the IoT device 300 can facilitate sending calls, messages, etc. to one or more other related devices (e.g., device 202B, device 202C, and device 202D) and/or an external device 204 and/or receiving calls, messages, etc. from one or more other related devices (e.g., device 202B, device 202C, and device 202D) and/or an external device 204.

In some examples, the provisioning module 516 can send a communication to the IoT device 300 and/or the mobile device 400 to indicate that provisioning the line and/or device sharing capabilities to the IoT device 300 was successful (or not successful).

Network hardware 522 provides wired or wireless networking capabilities to the server(s) 500. The network hardware 522 can include or be incorporated into processors, application-specific integrated circuits (ASICs), programmable circuits such as field programmable gate arrays (FPGAs), or in other ways. The software modules stored on the computer-readable media 504 are configured to access hardware via interrupts, calling APIs, and the like. The software modules can also be configured to pass information to one another, such as through APIs, storing commands, parameters, etc. in a predetermined memory location, etc. Other examples are possible without departing from the scope of this disclosure.

Figure 6:
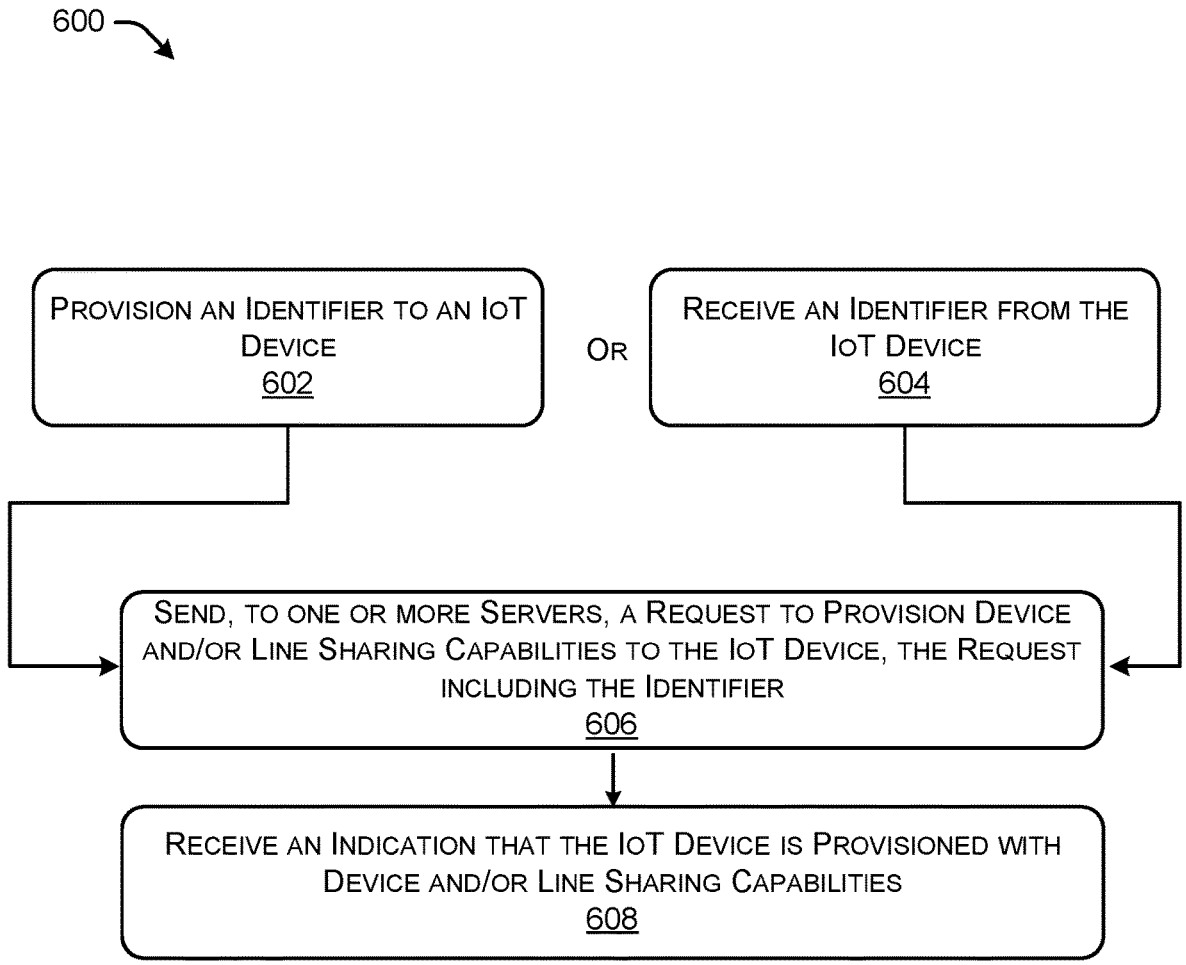
FIG. 6 illustrates an example process for enabling provisioning device and/or line sharing capabilities to an IoT device.
Figure 7:
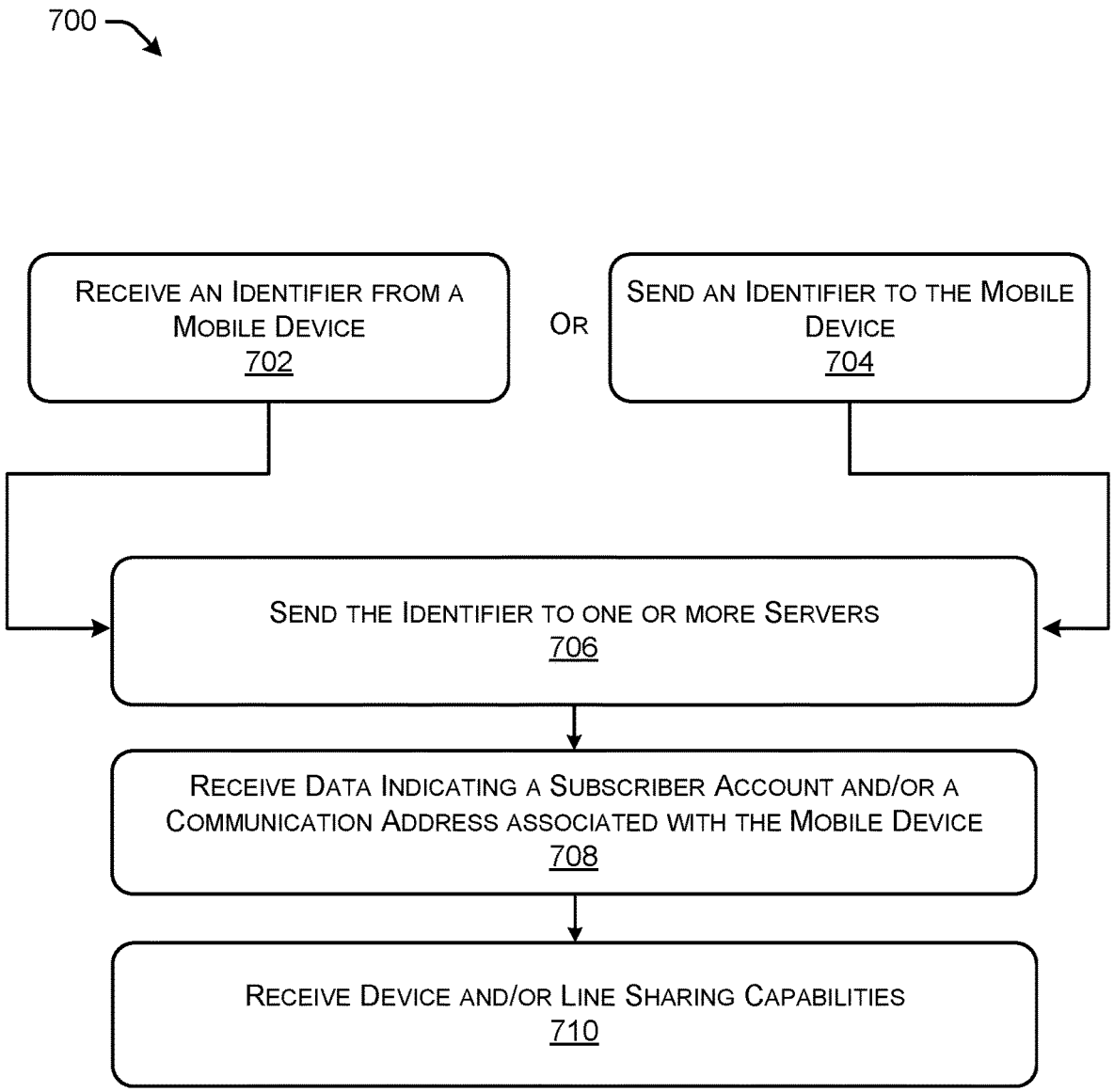
FIG. 7 illustrates an example process for receiving device and/or line sharing capabilities at an IoT device.
Figure 8:
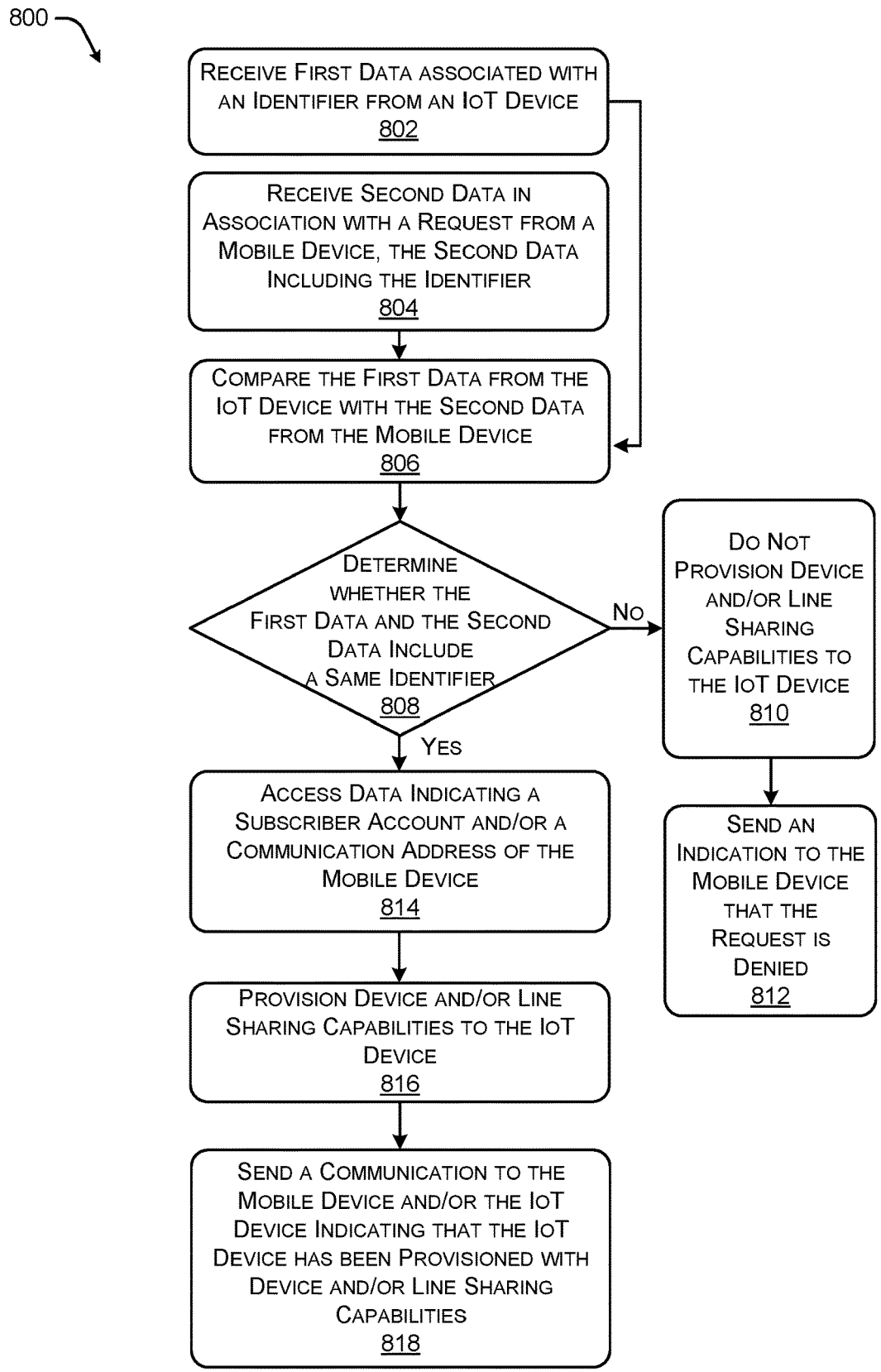
FIG. 8 illustrates an example process for provisioning device and/or line sharing capabilities to an IoT device.

FIGS. 6-8 describe example processes for provisioning device and/or line sharing capabilities to IoT device(s). The example processes are described in the context of the environments of FIGS. 1-5, but are not limited to those environments.

FIG. 6 illustrates an example process 600 for enabling provisioning device and/or line sharing capabilities to an IoT device.

Block 602 illustrates provisioning an identifier to an IoT device. In at least one example, the data transmission module 412 can provision a token to an IoT device 300. As described above, the token can be data that includes an identifier. In some examples, the data transmission module 412 can provision the token responsive to a request from the IoT device 300. In other examples, the data transmission module 412 can provision the token without receiving a request for such information. As described above, in addition to providing an identifier to the IoT device 300, in some examples, the data transmission module 412 can provision an IoT device 300 with data indicating the subscriber account and/or the communication address associated with the mobile device 400. In some examples, the token and/or data indicating a subscriber account and/or a communication address associated with the mobile device 400 can be provisioned to the IoT device 300 via a short-range communication network (e.g., Bluetooth®, Near Field Communication (NFC), etc.).

Block 604 illustrates receiving an identifier from the IoT device. In an alternate example, the data transmission module 412 can receive a token from an IoT device 300. For instance, in some examples, the data transmission module 412 can send a request to the IoT device 300 for a token. The data transmission module 412 can receive a token from the IoT device 300 responsive to the request. In alternate examples, the data transmission module 412 can receive a token from the IoT device 300 without prompting the IoT device 300 for such information. In some examples, the token can be provisioned to the mobile device 400 via a short-range communication network (e.g., Bluetooth®, Near Field Communication (NFC), etc.).

In at least one example, the data transmission module 412 can store the token in a token database 418. The token database 418 can be configured to store tokens temporarily until the data transmission module 412 sends the token to the one or more servers 500, as described below.

Block 606 illustrates sending, to one or more servers, a request to provision device and/or line sharing capabilities to the IoT device, the request including the identifier. In at least one example, the data transmission module 412 can send a request to one or more servers 500. The request can indicate that the mobile device 400 desires to provision its subscriber account and/or communication address to the IoT device 300. The request can also include the token to identify which IoT device the mobile device 400 desires to provision the device and/or line sharing capabilities. That is, the data transmission module 412 can access the token from the token database 418 and send the token with the request. In some examples, the request can also include data indicating the subscriber account and/or the communication address. That is, in some examples, the data transmission module 412 can access the profile associated with the SIM card 416 and can send data indicating the subscriber account and/or the communication address associated with the mobile device 400 to the server(s) 500.

Block 608 illustrates receiving an indication that the IoT device is provisioned with device and/or line sharing capabilities. In at least one example, responsive to sending the request to the server(s) 500, the UI module 414 can receive an indication that an IoT device 300 has been provisioned with device and/or line sharing capabilities and the UI module 414 can present a notification to a user that the IoT device 300 has been provisioned with device and/or line sharing capabilities via the display device 420. In an alternate example, if the request is denied, the UI module 414 can receive an indication that the request is denied and the UI module 414 can present a notification to a user that the request is denied.

FIG. 7 illustrates an example process 700 for receiving device and/or line sharing capabilities at an IoT device.

Block 702 illustrates receiving an identifier from a mobile device. In at least one example, the authentication module 312 can receive data that includes an identifier from a mobile device 400. Such data may be described herein as a token, as described above. In some examples, the authentication module 312 can send a request to the mobile device 400 for the token. In other examples, the authentication module 312 can receive the token without having requested such information. In at least one example, the authentication module 312 can receive data indicating a subscriber account and/or a communication address associated with the mobile device 400 in addition to the token. In some examples, the token and/or data indicating a subscriber account and/or a communication address associated with the mobile device 400 can be provisioned to the authentication module 312 via a short-range communication network (e.g., Bluetooth®, Near Field Communication (NFC), etc.).

In at least one example, the authentication module 312 can store the token in a token database 318. The token database 318 can be configured to store tokens temporarily until the authentication module 312 sends the token to the one or more servers 500, as described below.

Block 704 illustrates sending an identifier to the mobile device. In an alternate example, the authentication module 312 can provide a token to a mobile device 400 and the mobile device 400 can send the token with the request to provision its subscriber account and/or communication address to the IoT device 300. In some examples, the authentication module 312 can provide the token to the mobile device 400 responsive to a request for the token. In other examples, the authentication module 312 can provide the token to the mobile device 400 without a request for such information. In some examples, the token can be provisioned to the mobile device 400 via a short-range communication network (e.g., Bluetooth®, Near Field Communication (NFC), etc.).

Block 706 illustrates sending the identifier to one or more servers. The authentication module 312 can provide the token to the server(s) 500. In at least one example, the authentication module 312 can receive a request for the token and, responsive to receiving the request, the authentication module 312 can access the token from the token database 318 and can send the token to the server(s) 500. In alternate examples, the authentication module 312 can send the token to the server(s) 500 without being prompted for such information. In at least one example, the token can be provisioned to the server(s) 500 via a long-range communication network (e.g., wi-fi, cellular, radio, etc.).

Block 708 illustrates receiving data indicating a subscriber account and/or communication address associated with the mobile device. In at least one example, the profile management module 310 can receive data associated with a subscriber account, a communication address, etc. from the mobile device 400 and/or the server(s) 500 and can associate such data with the profile. For instance, in at least one example, the authentication module 312 can receive data indicating a subscriber account and/or a communication address associated with the mobile device 400 in addition to the token. In other examples, the authentication module 312 can receive data indicating a subscriber account and/or a communication address associated with the mobile device 400 from the server(s) 500 after the server(s) 500 have authenticated the IoT device 300. In at least one example, responsive to receiving data indicating a subscriber account and/or a communication address associated with the mobile device 400, the profile management module 310 can program a profile associated with the SIM card 316 with the data indicating a subscriber account and/or a communication address associated with the mobile device 400.

Block 710 illustrates receiving device and/or line sharing capabilities. In at least one example, based at least in part on sending the token and the server(s) 500 authenticating the IoT device, the authentication module 312 can receive data to effectuate device and/or line sharing capabilities. For instance, in at least one example, the authentication module 312 can receive data enabling the IoT device 300 to access the functionality of the presence module 306 and/or the communication module 308. As a result, the communication module 308 can facilitate sending calls, messages, etc. to one or more other related devices (e.g., device 202B, device 202C, and device 202D) and/or an external device 204 and/or receiving calls, messages, etc. from one or more other related devices (e.g., device 202B, device 202C, and device 202D) and/or an external device 204. That is, as a result, the IoT device 300 can receive device and/or line sharing capabilities.

In at least one example, the UI module 314 can receive a notification that the IoT device 300 has been provisioned with device and/or line sharing capabilities and the UI module 314 can present a notification indicating such, as described above.

FIG. 8 illustrates an example process 800 for provisioning device and/or line sharing capabilities to an IoT device.

Block 802 illustrates receiving first data associated with an identifier from an IoT device. In at least one example, the provisioning module 516 can receive first data from an IoT device 300. The first data can include an identifier. That is, the first data can correspond to a token as described above. As described above, in some examples, the IoT device 300 can provide the first data to the server(s) 500 responsive to a request for the first data. In other examples, the IoT device 300 can provide the token to the server(s) 500 without a request for the first data.

Block 804 illustrates receiving second data in association with a request from a mobile device, the second data including the identifier. Provisioning module 516 can receive a request from a mobile device 400. As described above, the request can include second data, which can include an identifier, and an indication that the mobile device 400 desires to provision an IoT device 300 with device and/or line sharing capabilities based on the subscriber account and/or communication address associated with the mobile device 400. The second data can correspond to a token as described above. In some examples, the request can include data indicating the subscriber account and/or communication address associated with the mobile device 400. In other examples, the request can be associated with data identifying the mobile device 400.

Block 806 illustrates comparing the first data from the IoT device with the second data from the mobile device. The provisioning module 516 can compare the first data received from the IoT device 300 with the second data received from the mobile device 400. That is, in at least one example, the provisioning module 516 can authenticate the IoT device 300 based at least in part on comparing the tokens.

Block 808 illustrates determining whether the first data and the second data include a same identifier. That is, the provisioning module 516 can compare the first data and the second data to determine whether the first data and the second data include a same identifier. Based at least in part on determining that the first data and the second data do not include the same identifier, the provisioning module 516 can determine not to provision device and/or line sharing capabilities to the IoT device, as illustrated in block 810. Based at least in part on determining not to provision device and/or line sharing capabilities to the IoT device, the provisioning module 516 can send an indication to the mobile device that the request is denied, as illustrated in block 812.

Based at least in part on determining that the first data and the second data include the same identifier, the provisioning module 516 can access data indicating a subscriber account and/or a communication address of the mobile device. In some examples, the request can include data indicating the subscriber account and/or communication address associated with the mobile device 400. In such examples, the request can access the data indicating the subscriber account and/or the communication address from the request. In other examples, if the request does not include data indicating the subscriber account and/or communication address associated with the mobile device 400, the provisioning module 516 can access data identifying the mobile device 400 and access the relational database 518 to determine the subscriber account and/or communication address associated with the mobile device 400.

Block 816 illustrates provisioning device and/or line sharing capabilities to the IoT device. Based at least in part on the first data and the second data being associated with a same identifier, the provisioning module 516 can provision device and/or line sharing capabilities to the IoT device 300. In at least one example, the provisioning module 516 can instruct the database management module 514 to update the relational database 518 to indicate that the IoT device 300 is associated with the subscriber account and/or communication address of the mobile device 400. In such examples, the database management module 514 can update the relational database 518 to indicate that the IoT device 300 is associated with the subscriber account and/or communication address associated with the mobile device 400.

In at least one example, the provisioning module 516 can provide the subscriber account and/or communication address associated with the mobile device 400 to the IoT device 300. In additional and/or alternate examples, the mobile device 400 may have already provisioned the IoT device 300 with the subscriber account and/or communication address. In either example, the provisioning module 516 can provision the device and/or line sharing capabilities. For instance, in at least one example, the provisioning module 516 can send data enabling the IoT device 300 to access the functionality of the presence server module 506 (via the presence module 306) and/or the communication server module 508 (via the communication module 308). As a result, the IoT device 300 can facilitate sending calls, messages, etc. to one or more other related devices (e.g., device 202B, device 202C, and device 202D) and/or an external device 204 and/or receiving calls, messages, etc. from one or more other related devices (e.g., device 202B, device 202C, and device 202D) and/or an external device 204. That is, as a result, the IoT device 300 can receive device and/or line sharing capabilities.

Block 818 illustrates sending a communication to the mobile device and/or the IoT device indicating that the IoT device has been provisioned with device and/or line sharing capabilities. In some examples, the provisioning module 516 can send a communication to the IoT device 300 and/or the mobile device 400 to indicate that provisioning the line and/or device sharing capabilities to the IoT device 300 was successful.

The processes described above in association with FIGS. 6-8 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. In other embodiments, hardware components perform one or more of the operations. Such hardware components can include or be incorporated into processors, application-specific integrated circuits (ASICs), programmable circuits such as field programmable gate arrays (FPGAs), or in other ways. The order in which the operations are described is not intended to be construed as a limitation, and any number of the described operations can be combined in any order and/or in parallel to implement the processes.

Although the subject matter has been described in language specific to structural data items and/or methodological acts, it is to be understood that the subject matter defined in the appended claims is not necessarily limited to the specific data items or acts described. Rather, the specific data items and acts are disclosed as exemplary forms of implementing the claims.

What is claimed is:

1. A method comprising:
   receiving, by a server from an Internet of Things (IoT) device, a token comprising an identifier;
   receiving, by the server from a mobile device, a request to provision the IoT device to share at least one of a subscriber account or a communication address associated with the mobile device, wherein the request includes the token comprising the identifier;
   determining, by the server, that the token comprising the identifier has been received from both the IoT device and the mobile device; and
   provisioning, by the server, sharing capabilities to the IoT device to enable the IoT device to at least one of send or receive communications using the communication address or a different communication address of the subscriber account.

2. The method of claim 1, further comprising authenticating, by the server, the IoT device based on the determining that that the token comprising the identifier has been received from both the IoT device and the mobile device.

3. The method of claim 1, wherein the mobile device provides the token to the IoT device prior to the server receiving the token from the IoT device.

4. The method of claim 1, wherein the IoT device provides the token to the mobile device prior to the server receiving the token from the mobile device in the request.

5. The method of claim 1, wherein the mobile device provides an indication of the at least one of the subscriber account or the communication address to the IoT device prior to the server provisioning the sharing capabilities to the IoT device.

6. The method of claim 1, further comprising providing, by the server, an indication of the at least one of the subscriber account or the communication address to the IoT device in association with the provisioning of the sharing capabilities to the IoT device.

7. The method of claim 1, further comprising storing, by the server in a network database, relationship data associating the at least one of the subscriber account or the communication address with both the IoT device and the mobile device.

8. The method of claim 1, further comprising providing, by the server, presence information to at least one of the IoT device and the mobile device indicating that the IoT device and the mobile device are related devices that share the at least one of the subscriber account or the communication address.

9. The method of claim 8, wherein the presence information enables a first one of the IoT device or the mobile device to establish a connection with a second one of the IoT device or the mobile device.

10. The method of claim 8, wherein the presence information comprises data about capabilities of at least one of the IoT device or the mobile device.

11. An Internet of Things (IoT) device comprising:
one or more processors;
memory; and
a plurality of programming instructions stored on the memory and executable by the one or more processors to perform operations comprising:
sharing a token with a mobile device associated with at least one of a subscriber account or a communication address, the token comprising an identifier;
sending the token to a server; and
receiving sharing capabilities from the server, in response to the server also receiving the token from the mobile device in a request that the IoT device be provisioned to share the at least one of the subscriber account or the communication address, the sharing capabilities enabling the IoT device to at least one of send or receive communications using the communication address or a different communication address of the subscriber account.

12. The IoT device of claim 11, wherein the sharing the token comprises transmitting the token from the IoT device to the mobile device.

13. The IoT device of claim 11, wherein the sharing the token comprises receiving the token from the mobile device.

14. The IoT device of claim 11, wherein the operations further comprise receiving an indication of the at least one of the subscriber account or the communication address from the mobile device prior to the receiving the sharing capabilities from the server.

15. The IoT device of claim 11, wherein the receiving the sharing capabilities from the server further comprises receiving an indication of the at least one of the subscriber account or the communication address from the server.

16. The IoT device of claim 11, wherein the operations further comprise retrieving, from the server, presence information associated with the mobile device or another related device that that shares the at least one of the subscriber account or the communication address.

17. A method comprising:
sharing, by an Internet of Things (IoT) device, a token with a mobile device associated with at least one of a subscriber account or a communication address, the token comprising an identifier;
sending, by the IoT device, the token to a server; and
receiving, by the IoT device, sharing capabilities from the server in response to the server also receiving the token from the mobile device in a request that the IoT device be provisioned to share the at least one of the subscriber account or the communication address, the sharing capabilities enabling the IoT device to at least one of send or receive communications using the communication address or a different communication address of the subscriber account.

18. The method of claim 17, wherein the sharing the token comprises the IoT device receiving the token from the mobile device or providing the token to the mobile device.

19. The method of claim 17, further comprising receiving, by the IoT device, an indication of the at least one of the subscriber account or the communication address from the mobile device or from the server.

20. The method of claim 17, further comprising retrieving, by the IoT device from the server, presence information associated with the mobile device or another related device that that shares the at least one of the subscriber account or the communication address.

* * * * *